(12) United States Patent
Barkan et al.

(10) Patent No.: US 12,493,761 B2
(45) Date of Patent: Dec. 9, 2025

(54) INDICIA READERS WITH STRUCTURE LIGHT ASSEMBLIES

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 76 days.

(21) Appl. No.: 18/375,394

(22) Filed: Sep. 29, 2023

(65) Prior Publication Data

US 2025/0111180 A1    Apr. 3, 2025

(51) Int. Cl.
*G06K 7/10* (2006.01)
(52) U.S. Cl.
CPC ................................. *G06K 7/10564* (2013.01)
(58) Field of Classification Search
None
See application file for complete search history.

(56) References Cited

U.S. PATENT DOCUMENTS

| | | | | |
|---|---|---|---|---|
| 9,800,749 | B1* | 10/2017 | Tan | H04N 1/02409 |
| 2023/0114004 | A1* | 4/2023 | Gurevich | G06K 7/10881 |
| | | | | 235/454 |
| 2024/0353651 | A1* | 10/2024 | Gurevich | G06K 7/1439 |

* cited by examiner

*Primary Examiner* — Thien M Le
*Assistant Examiner* — April A Taylor
(74) *Attorney, Agent, or Firm* — Yuri Astvatsaturov

(57) ABSTRACT

Various vision devices are disclosed herein. An example vision device is an indicia reader that includes a housing, an imaging assembly having a field of view (FOV) extending into a product-scanning region and configured to capture image data depicting an environment appearing within the FOV, and an illumination assembly configured to emit a structured light into the product-scanning region such that at least a portion of the structured light overlaps with at least a portion of the FOV in the product-scanning region. The indicia reader is selectively operable pursuant to one of a first or a second set of operating parameters based on a distance value, where that value is determined by analyzing, in the image data, an appearance of the structured light on some portion of an object appearing within the FOV.

20 Claims, 5 Drawing Sheets

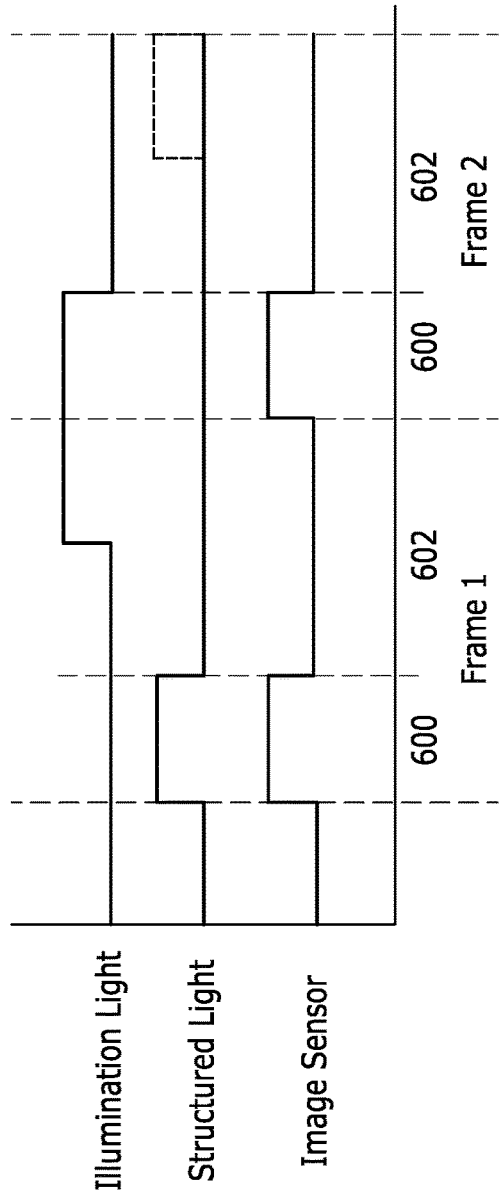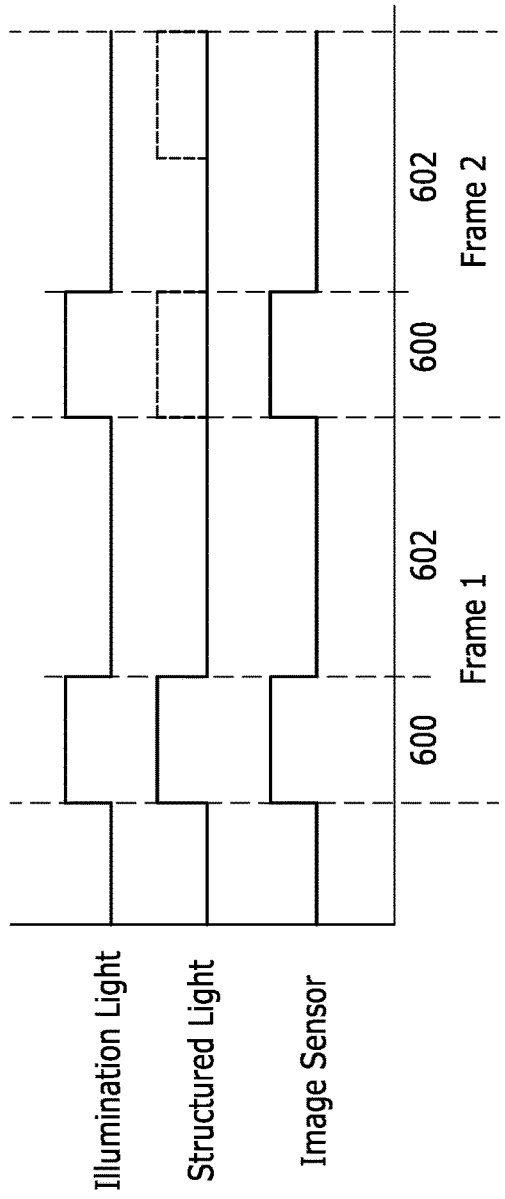

INDICIA READERS WITH STRUCTURE LIGHT ASSEMBLIES

BACKGROUND

Traditionally, indicia readers like barcode readers have been concerned with extracting the best possible decode performance. Typically, this meant focusing on hardware and software component of the reader to obtain a decode of an indicia within any part of the reader's field of view (FOV). However, as these readers evolve with the FOVs becoming larger, with imaging components increasing the fidelity of the images, and the decoding algorithms improving, operators find themselves in situations where indicia outside a designated product-scanning region are being inadvertently read and their payload data is being transmitted to the host unintentionally. This creates problems like potential double scanning of items, hindering the performance of the reader and creating additional work for the operators. Thus, there is a need for devices, systems, and methods for limiting a read-volume of an indicia reader and for selectively operating the reader based on where an object appears relative to that volume.

SUMMARY

Accordingly, at least some embodiments of the resent disclosure relate to devices, systems, and methods for limiting a read-volume of an indicia reader and for selectively operating the reader based on where an object appears relative to that volume.

In an embodiment, the present invention is an indicia reader having a product-scanning region, comprising: a housing; an imaging assembly positioned at least partially within the housing and having at least one field of view (FOV) extending into the product-scanning region, the imaging assembly configured to capture image data depicting an environment appearing within the at least one FOV; an illumination assembly configured to emit a structured light into the product-scanning region such that at least a portion of the structured light overlaps with at least a portion of the at least one FOV in the product-scanning region, the light includes a structured light; and a processor configured to: process at least some first portion of the image data to determine a distance value based on an appearance of the structured light on at least a first portion of an object in the at least some first portion of the image data; and cause the indicia reader to operate pursuant to one of a first set of operating parameters or a second set of operating parameters based on the distance value.

In a variation of this embodiment, the processor is further configured to: process at least some second portion of the of the image data to determine a position of at least a second portion of the object within the at least one FOV, resulting in a determined position, the at least some second portion of the of the image data being one of same as or different from the at least some first portion of the image data, the at least the second portion of the object being one of same as or different from the at least the first portion of an object; and cause the indicia reader to operate pursuant to one of the first set of operating parameters or the second set of operating parameters further based on the determined position.

In another embodiment, the present invention is a method of selectively operating an indicia reader, the method comprising: emitting, via an illumination assembly configured to emit a light into a product-scanning region of the indicia reader such that at least a portion of the light overlaps with at least a portion of at least one field of view (FOV) in the product-scanning region, the light into the product-scanning region wherein the light includes a structured light; capturing, via an imaging assembly positioned at least partially within a housing of the indicia reader and having the at least one FOV extending into the product-scanning region, image data depicting an environment appearing within the at least one FOV; processing, via a processor, at least some first portion of the image data to determine a distance value based on an appearance of the structured light on at least a first portion of an object in the at least some first portion of the image data; and causing, via the processor, the indicia reader to operate pursuant to one of a first set of operating parameters or a second set of operating parameters based on the distance value.

In a variation of this embodiment, the method further comprises: processing, via the processor, at least some second portion of the of the image data to determine a position of at least a second portion of the object within the at least one FOV, resulting in a determined position, the at least some second portion of the of the image data being one of same as or different from the at least some first portion of the image data, the at least the second portion of the object being one of same as or different from the at least the first portion of an object; and causing the indicia reader to operate pursuant to one of the first set of operating parameters or the second set of operating parameters further based on the determined position.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 5A and 5B illustrate exemplary illumination and exposure diagrams for operating the illumination assembly in accordance with various embodiments.

Figure 1:
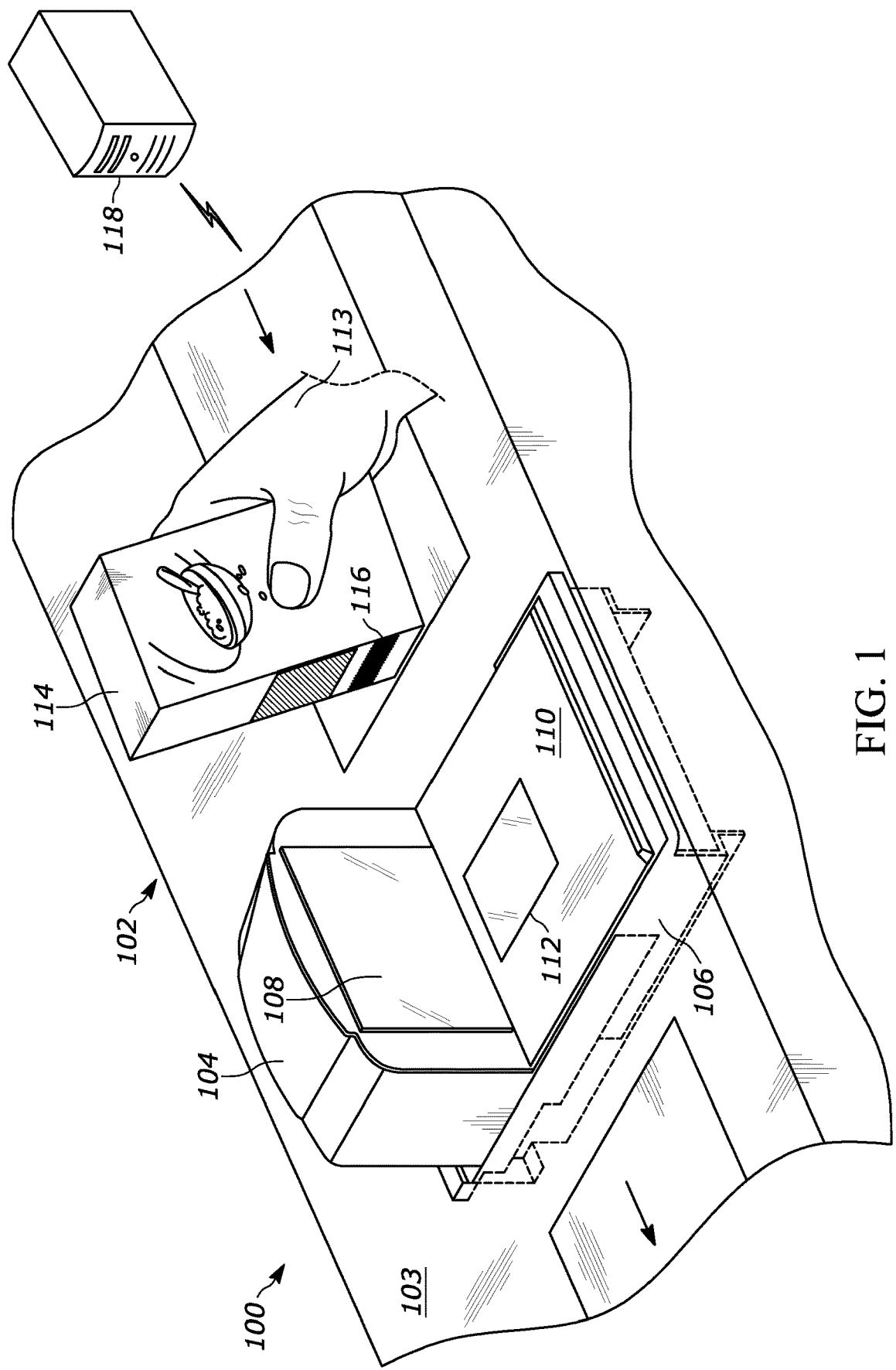
FIG. 1 is a perspective view of an example indicia reader that may be used to implement inventive concepts described here.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As used herein, the term "indicia" or "indicium" should be understood to refer to any kind of visual marker that can be associated with an item (also referred to as an "object" or "product") or a transaction. For example, indicia can be a 1D, 2D, or 3D barcode, a graphic, a logo, etc. Additionally, indicia may comprise encoded payload data as, for example, is the case with a 1D or 2D barcode where the barcode encodes a payload comprised of, for example, alphanumeric or special characters that may be formed into a string.

It has been recognized that as the imaging and decoding capabilities of indicia readers improve and evolve, items positioned in the vicinity of the reader may be inadvertently reader by the reader prior or subsequent to having that item be presented to the reader for imaging by the operator. As such, the present disclosure provides innovative approaches to solving this problem.

Referring to FIG. 1, shown therein is an example imaging device embodied in a bi-optic indicia reader 100. In the illustrated example, the bioptic indicia reader 100 is shown as part of a point-of-sale (POS) system arrangement 102 having the bioptic indicia reader 100 positioned within a workstation counter 103. Generally, the indicia reader 100 includes an upper housing 104 (also referred to as an upper portion, upper housing portion, or tower portion) and a lower housing 106 (also referred to as a lower portion, lower housing portion, or platter portion), collectively referred to as a housing. The upper housing 104 can be characterized by an optically transmissive window 108 positioned therein along a generally vertical (or upright) plane and one or more field of view (FOV) which passes through the window 108 and extends in a generally lateral direction. In some examples, a reference to a generally upright window shall be understood to mean a window inclined at an angle of up to 35 degrees relative to a vertical plane. The lower housing 106 can be characterized by a weigh platter 110 or a cover that includes an optically transmissive window 112 positioned therein along a generally horizontal (also referred to as a transverse) plane and one or more FOV which passes through the window 112 and extends in a generally upward direction. In some examples, a reference to a generally horizontal window shall be understood to mean a window inclined at an angle of up to 25 degrees relative to a horizontal plane. The weigh platter 110 is a part of a weigh platter assembly that generally includes the weigh platter 110 and a scale (or load cell) configured to measure the weight of an object placed the top surface of the weight platter 110. By that virtue, the top surface of the weight platter 110 may be considered to be the top surface of the lower housing 106 that faces a product scanning region there above.

In operation, a user 113 generally passes an item 114 across a product scanning region of the indicia reader 100 in a swiping motion in some general direction, which in the illustrated example is right-to-left. A product scanning region can be generally viewed as a region that extends above the platter 110 and/or in front of the window 108 where barcode reader 100 is operable to capture image data of sufficient quality to perform imaging-based operations like decoding a barcode that appears in the obtained image data. It should be appreciated that while items may be swiped past the indicia reader 100 in either direction, items may also be presented into the product scanning region by means other than swiping past the window(s). When the item 114 comes into the any of the fields of view of the reader, the indicia 116 on the item 114 is captured and decoded by the indicia reader 100 (and its respective modules and/or assemblies), and corresponding data (e.g., the payload of the indicia) is transmitted to a communicatively coupled host 118 (commonly comprised of a point of sale (POS) terminal).

Figure 2:
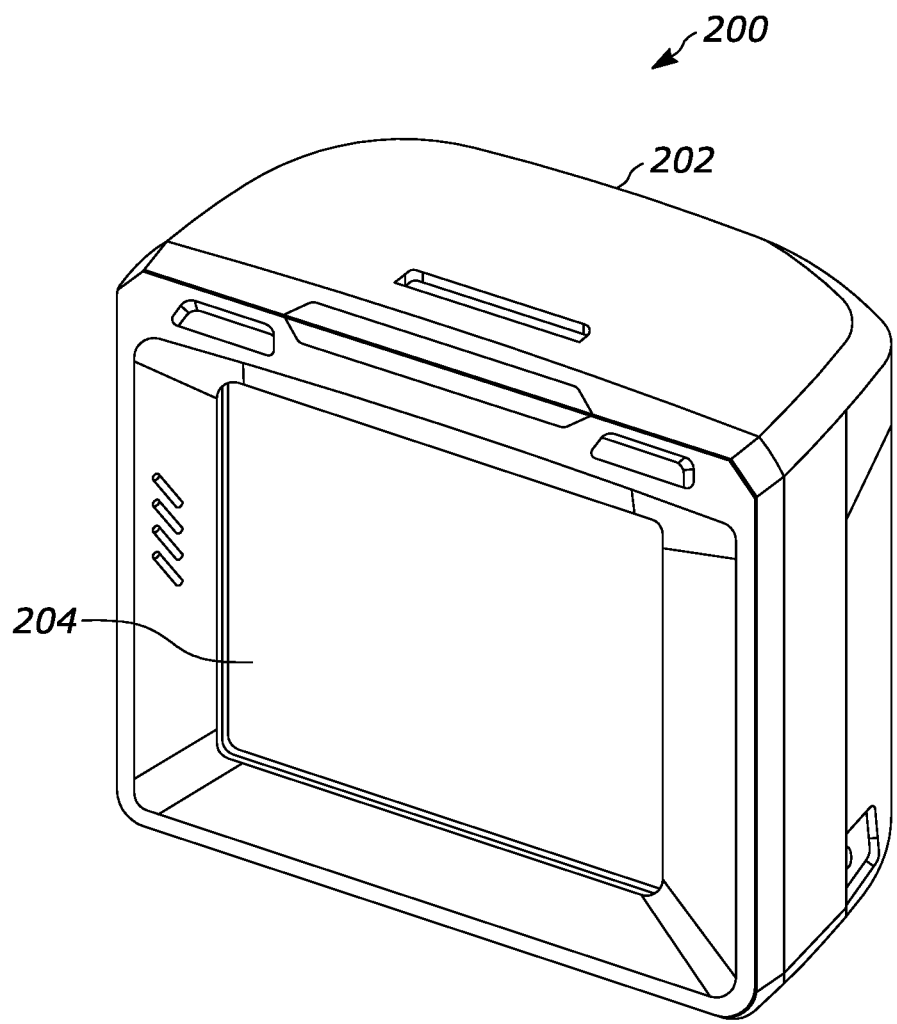
FIG. 2 is a perspective view of another example barcode reader that may be used to implement inventive concepts described here.

FIG. 2 illustrates another example of an indicia reader, sometimes referred to as a slot scanner. In the example shown, indicia reader 200 has a housing 202 and a window 204, which faces a product scanning region, to allow a set of optical components positioned within housing 202 to direct at least one field-of-view through window 204. Indicia reader 200 operates on a similar principle as the reader 100 of FIG. 1. However, it is generally smaller (typically having a window that is smaller than 5 inches across), includes a single window, and, while it could be installed in a slot of a counter (functioning like the bottom portion of the reader 100), it can also be used as a stationary scanner positioned on a working surface (functioning like the upper portion of the reader 100).

In the above-noted examples, and other various embodiments, the indicia reader may include a 2D imaging assembly that may include an image sensor (also referred to as an imager or imaging sensor) that can be, for example, a two-dimensional CCD or a CMOS sensor that can be either a monochrome sensor or a color sensor having, for instance 1.2 megapixels arranged in a 1200×960 pixel configuration. It should be appreciated that sensors having other pixel-counts (both below and above) may also be used. These two-dimensional sensors generally include mutually orthogonal rows and columns of photosensitive pixel elements arranged to form a substantially flat square or rectangular surface. Such imagers are operative to detect light captured by an imaging lens assembly along a respective optical path or axis that normally traverses through either of the generally horizontal or generally upright window(s) with the assistance of one or more splitter and/or fold mirrors (also referred to as a mirror arrangement).

In some embodiments, the imaging sensor may be formed of pixels operable to sense light in different wavelength ranges with some of those ranges being in the invisible (e.g., infrared) range. For example, the sensor may include a series of pixels operable to sense light in the 380 to 700 nanometers (nm) and it may also include pixels operable to sense light in the 700-1000 nm range. In this way, the sensor can capture image data that is both in the visible range and in the invisible range.

In the above-noted examples, and other various embodiments, the indicia reader may also include an illumination assembly that is operable to provide light for various purposes. In some cases, the illumination may provide, via a sub-assembly, structured light such that the evaluation of the light's pattern in an image, along with the relative positions of the imaging FOV and the structure light FOV may be used to determine the depth of a object that appears within the imaging FOV in terms of its distance from, for example, the imaging sensor, the window through which the imaging FOV passes, etc. Additionally, the sensor may provide illumination light for illuminating the object in a substantially uniform manner such that it become sufficiently illuminated for imaging and processing (e.g., indicia decoding) purposes.

Figure 3:
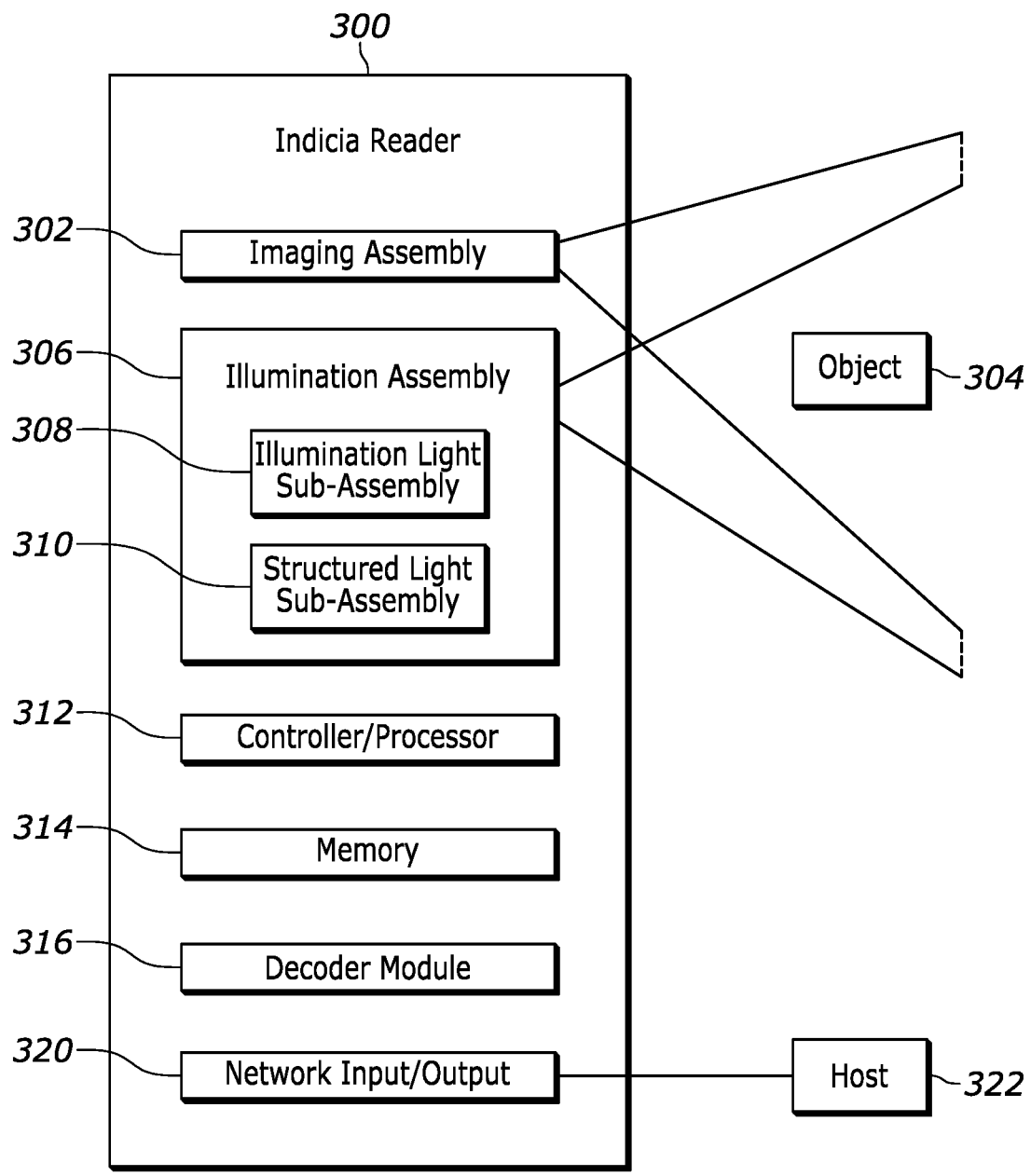
FIG. 3 is a schematic block diagram of an example imaging device implemented in accordance with some examples of the present disclosure.

These and other components of an example reader can be seen in a schematic block diagram 300 of FIG. 3. As represented therein, an example indicia reader 300, regardless or form factor, includes an imaging assembly 302 that is operable to capture image data over a field of view (FOV) 304 of an object 306 appearing within said FOV. As will be explain further, during imaging operations the reader can leverage light produced by the illumination assembly 306, and particularly the illumination light sub-assembly 308 and the structured light sub-assembly 310. Operations of the reader 302, and the various modules, can be controlled via a controller (may also be referred to as a processor) 312 by way of executing various instructions stored in the memory 314. To perform decode operations, the reader further include a decoder module 316 that can analyze image data captured by the imaging assembly 302 and decode various indicia that may be present therein. Once decoded, the controller 312 can cause the reader to transmit the decoded payload data, via a network I/O module 320, to a host 322 that is communicatively (wired or wirelessly) coupled with the imaging device. In some cases, image data itself of information related thereto may be transmitted to the host 322.

Figure 4B:
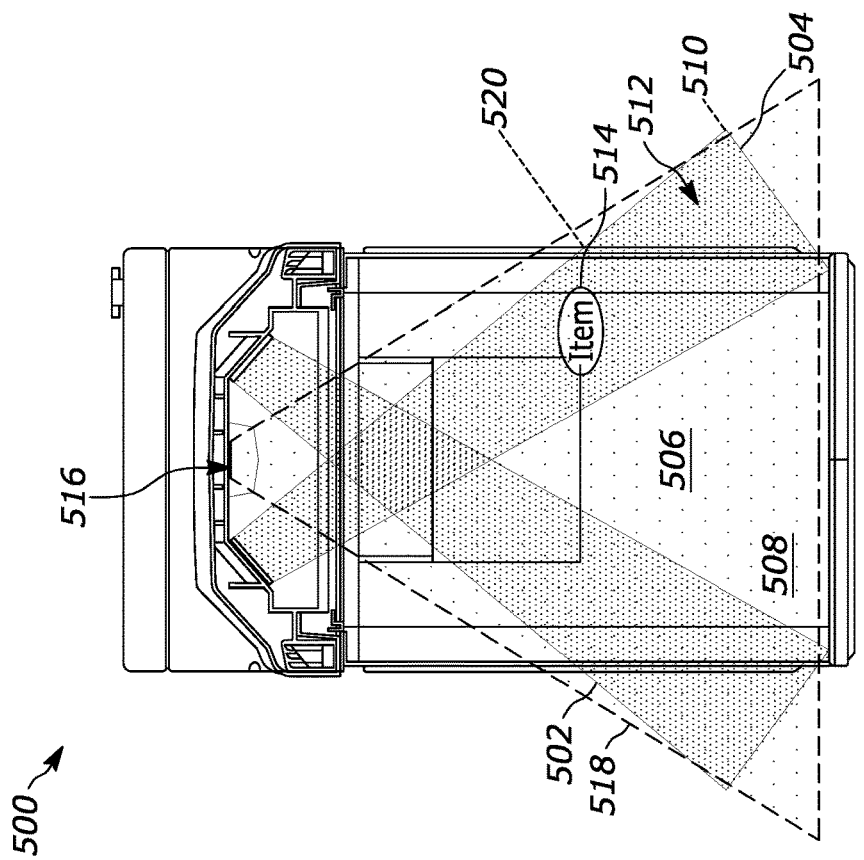
FIGS. 4A and 4B illustrate various exemplary states of an object positioned relative to a product-scanning region of an indicia reader.
Figure 4A:
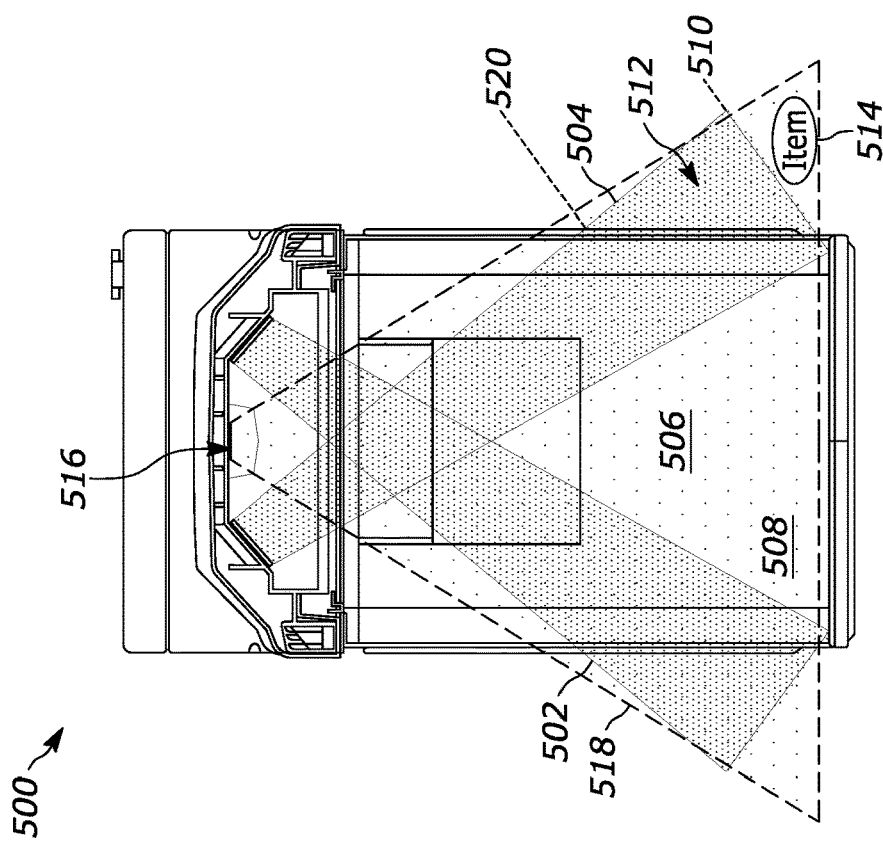

Referring now to FIGS. 4A and 4B, shown therein is an exemplary indicia reader 500 embodied in a bi-optic reader like the one illustrated in FIG. 1. Specifically, the views illustrate sectioned top views of the reader 500 with two imager FOVs 502 and 504 extending from their respective mirrors into the product scanning region 506 of the reader 500. It will be appreciated that these FOVs are exiting the tower portion of the reader through its upright window and extend across a volumetric space extending in height, width, and depth. Additionally, these FOVs may be produced via a mirror arrangement whereby each FOV is redirected and/or split from its original imaging sensor. Also, while in some cases both FOVs converge at one image sensor, in other examples each FOV may have its respective image sensor.

As illustrated, the FOVs exemplarily traverse over the reader's platter 508 in a crisscross manner such that they extend across the platter's lateral sides. In typical applications, readers like the reader 500 will have a volume in related to the platter where operators can expect to present items for imaging purposes. This region can be referred to as a product-scanning region. In examples this region may be defined by the perimeter of the platter 508 with the volume extending a predetermined distance above the platter. Additionally, the space does not have to be cuboidal and can be further defined by the space that corresponds to the various FOVs that are a part of the reader. As such, in an example the product-scanning region may be defined by the boundaries of the FOVs together with the lateral boundaries of the platter perimeter.

Keeping such exemplary definition in consideration, FIGS. 4A and 4B illustrate the FOVs 502 and 504 extending both in and outside the product scanning region. Since it is desirable to have each FOV configured with a working range that extends at least as far as the length of the platter, the operable working distance of each respective FOV creates imaging zones that fall outside the product-scanning region. This can be seen with reference to FOV 504 where it is preferred that items imaged near its left edge can be imaged as far back as the distal edge of the platter. As a result, FOV 504 has a working distance that extends at least as far back as the line 510, creating a region 512 where, despite that region falling outside the product-scanning region 506, items, like item 514, can still be imaged with sufficient quality for various vision purposes. As a result, if, as shown in FIG. 4A, item 514 is inadvertently positioned next to the reader 500 with its barcode within the view of the FOV 504, the reader may decode that barcode prematurely and transmit the payload to the host. Subsequent to that, the operator may again present the item 514 to the reader for intentional reading and cause a double-read of that item.

To help address such instances and prevent a performance of a vision operation like a decoding of a barcode when an item is imaged in regions 512, the reader 500 includes an illumination assembly that can provide both substantially uniform illumination light for sufficiently illuminating items for image processing purposes like barcode decoding and item identification, and structured light that, when analyzed, can be used to determine physical characteristics of an item including its depth relative to, for example, the imaging assembly.

In the example of FIGS. 4A and 4B, the illumination assembly 516 emits a structured light over the structured light illumination field 518 which at least partially overlaps with each FOV 502 and 504. In this manner, whenever item 514 ends up being positioned within the FOV 502,504 in the product-scanning region 506 or in the outer regions 512, that item can be illuminated by the structured light. To help determine if the item is within the product-scanning region 506, the processor of the indicia reader can analyze image data across the FOVs 502, 504, and specifically the appearance of the structured light, to determine a distance value of the item. In some instances, the structured light pattern includes a plurality of vertical lines, where the imager checks the distance between the lines as they appear on an item. It could also be a grid or any other pattern that allows for a detection of elements of a visual pattern appearing in a FOV. In this example, the preferred embodiment may have the structured light source close to the outbound imaging axis (the boundary) of each FOV. With the structured light field of illumination being emitted at a different angle than the imaging FOV, the distance between the pattern elements (like the bars) changes over distance as observed through the FOV. Upon determining the depth value, a further determination can be made as to whether the item is positioned within or outside the product-scanning region.

For example, if the depth value indicates that the item is positioned past the distance indicated by line 510 as is shown in FIG. 4A, it can be determined that the item is positioned outside the product-scanning region. On the other hand, if the depth value indicates that the item is positioned close than the distance indicated by line 520 as is shown in FIG. 4B, it can be determined that the item is positioned within the product-scanning region. Additionally, the position of the item within the FOV can be considered to further help with the determination. For instance and with reference to FOV 504, the FOV can be divided into a series of regions. If the item is determined to be at a distance between the lines 520 and 510, and its position within the FOV indicates that it is positioned near the left edge, then such a distance value in combination with such position value would indicate that the item is within the product-scanning region. In contrast, if the item is determined to be at a distance between the lines 520 and 510, and its position within the FOV indicates that it is positioned near the right edge, then such a distance value in combination with such position value would indicate that the item is outside the product-scanning region. Those of ordinary skill in the art will appreciate that a higher resolution of regions and depth values may yield a more accurate determination of wither the item is within the bounds of the product-scanning region or not.

Using the approaches above, items placed near the reader and within the view of the imaging assembly may avoid being scanned until truly presented for reading purposes. For example, if the item ends up being positioned as shown in FIG. 4A with a barcode visible to the imaging assembly, the reader may be configured to, responsive to determining that the item is outside the product-scanning region, either not transmit the image data to a decoder module or to abstain from transmitting the decoded payload of indicia to the host. In either case, from the point of view of the host, an item has not been read by the reader and thus a double count can be avoided.

However, it's worth noting that not all vision operations must be reduced based on an item being positioned outside the product-scanning region. For instance, regions like regions 512 may still be considered for, for example, wake-up purposes, direction detection, etc. As an example, if an item is detected outside the product scanning region the reader may remain in a relatively low operating mode and if an item is detected in the product-scanning region the reader can transition to a relatively higher operating mode. Differences between the two may include, for example, operating the illumination sub-assembly at a relatively lower or a relatively higher regime. Such determinations are within the scope of one of ordinary skill in the art and the key is that a reader may be operated pursuant to one set of parameters when an item if within the product-scanning region and pursuant to another set of parameters when the item is outside the product-scanning region.

While using structured light to help determine the volumetric position of an item in or near the product-scanning region, is may also be important to maintain effective uniform illumination of the item. FIGS. 5A and 5B illustrate exemplary illumination and exposure diagrams that may be implemented in connection with the concepts described herein.

Referring to FIG. 5A, shown therein are the states of an image sensor, the structured light sub-assembly, and the illumination light sub-assembly. The state of each component is shown over the duration of two frames with each frame having an exposure period 600 where the image sensor operates to collect image data and a non-exposure period 602 during which the image sensor is not collecting image data. In the example of FIG. 5A, the reader is configured such that, for the first frame, the structure light is active during the exposure period 600 and the illumination light is active during the non-exposure period 600. In a subsequent frame 2 (which may not need to follow frame 1 immediately), the illumination light is active during the exposure period and the structure light is optionally active during the non-exposure period. This approach can be specifically useful when the wavelength range of the structure light overlaps with the wavelength range of the illumination light. By staggering the emission of lights, the sensor is likely to capture images of greater fidelity with less interference between the various light signals. It is also useful when operating the reader at a framerate that is lower than two times the flicker fusion threshold, allowing the illumination light to retain a substantially solid appearance to the operator.

Another example of an illumination scheme is illustrated in FIG. 5B where during the first frame both illumination and structured light are provided during the exposure period 600. Subsequent to this, the structured light may be completely omitted, it may once again be provided during the exposure period, or it may be shifted to occur during the non-exposure period 602. This approach may be more useful in configurations where one of the illumination sources (e.g., the structured light sub-assembly) provides light in the non-visible spectrum while the other illumination source (e.g., the illumination light sub-assembly) provides light in the visible spectrum. In this case, it is preferred to avoid either wavelength range overlap, allowing the image sensor to simultaneously capture image data represented by two separate wavelengths of light.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An indicia reader having a product-scanning region, comprising:
   a housing;
   an imaging assembly positioned at least partially within the housing and having at least one field of view (FOV) extending into the product-scanning region, the imaging assembly configured to capture image data depicting an environment appearing within the at least one FOV;
   an illumination assembly configured to emit a structured light into the product-scanning region such that at least a portion of the structured light overlaps with at least a portion of the at least one FOV in the product-scanning region; and
   a processor configured to:
      process at least some first portion of the image data to determine a distance value based on an appearance of the structured light on at least a first portion of an object in the at least some first portion of the image data; and
      cause the indicia reader to operate pursuant to one of a first set of operating parameters or a second set of operating parameters based on the distance value.

2. The indicia reader of claim 1, wherein the processor is further configured to:
   process at least some second portion of the image data to determine a position of at least a second portion of the object within the at least one FOV, resulting in a determined position, the at least some second portion of the image data being one of same as or different from the at least some first portion of the image data, the at least the second portion of the object being one of same as or different from the at least the first portion of the object; and
   cause the indicia reader to operate pursuant to one of the first set of operating parameters or the second set of operating parameters further based on the determined position.

3. The indicia reader of claim 2, wherein the processor is further configured to:
   cause the indicia reader to operate pursuant to the first set of operating parameters responsive to the distance value in combination with the determined position being indicative of at least some portion of the object being absent from the product scanning region; and cause the indicia reader to operate pursuant to the second set of operating parameters responsive to the distance value in combination with the determined position being indicative of the at least some portion of the object being within the product scanning region.

4. The indicia reader of claim 3, wherein the first set of operating parameters includes a relatively reduced operating mode, and the second set of operating parameters includes a relatively increased operating mode.

5. The indicia reader of claim 4, wherein the illumination assembly is further configured to emit an illumination light for illuminating the object in a substantially uniform manner during image capture,
wherein the reduced operating mode includes operating the illumination assembly such that the illumination light is one of (i) in an off state or (ii) in a relatively lower illumination state, and
wherein the increased operating mode includes operating the illumination assembly such that the illumination light is one of (i) in an on state or (ii) in a relatively higher illumination state.

6. The indicia reader of claim 3, wherein the first set of operating parameters includes at least one of not decoding an indicia appearing within the at least one FOV or not transmitting a payload of the indicia to a host, and the second set of operating parameters includes transmitting the payload of the indicia to the host.

7. The indicia reader of claim 1, wherein:
the illumination assembly is further configured to emit an illumination light for illuminating the object in a substantially uniform manner during image capture;
the structured light includes light in a first wavelength range;
the illumination light includes light in a second wavelength range, the first wavelength range being different from the second wavelength range; and
the imaging assembly is operable to sense light in both the first wavelength range and the second wavelength range.

8. The indicia reader of claim 7, wherein the first wavelength range is in the invisible range and the second wavelength range is in the visible range.

9. The indicia reader of claim 7 wherein the processor is further configured to:
cause the imaging assembly to capture image data over an exposure duration; and
cause the illumination assembly to provide both the structured light and the illumination light during the exposure duration.

10. The indicia reader of claim 7, wherein:
the image data includes (i) a first frame captured during a first-frame duration having a first-frame exposure period and a first-frame non-exposure period and (ii) a second frame captured during a second-frame duration having a second-frame exposure period and a second-frame non-exposure period; and
the processor is further configured to:
during the first-frame duration, cause the illumination assembly to emit the structured light during the first-frame exposure period and cause the illumination assembly to emit the illumination light during the first-frame non-exposure period; and
during the second frame duration, cause the illumination assembly to emit the illumination light during the second-frame exposure period.

11. A method of selectively operating an indicia reader, the method comprising:

emitting, via an illumination assembly configured to emit a light into a product-scanning region of the indicia reader such that at least a portion of the light overlaps with at least a portion of at least one field of view (FOV) in the product-scanning region, the light into the product-scanning region wherein the light includes a structured light;
capturing, via an imaging assembly positioned at least partially within a housing of the indicia reader and having the at least one FOV extending into the product-scanning region, image data depicting an environment appearing within the at least one FOV;
processing, via a processor, at least some first portion of the image data to determine a distance value based on an appearance of the structured light on at least a first portion of an object in the at least some first portion of the image data; and
causing, via the processor, the indicia reader to operate pursuant to one of a first set of operating parameters or a second set of operating parameters based on the distance value.

12. The method of claim 11, further comprising:
processing, via the processor, at least some second portion of the image data to determine a position of at least a second portion of the object within the at least one FOV, resulting in a determined position, the at least some second portion of the image data being one of same as or different from the at least some first portion of the image data, the at least the second portion of the object being one of same as or different from the at least the first portion of an object; and
causing the indicia reader to operate pursuant to one of the first set of operating parameters or the second set of operating parameters further based on the determined position.

13. The method of claim 12, further comprising:
causing, via the processor, the indicia reader to operate pursuant to the first set of operating parameters responsive to the distance value in combination with the determined position being indicative of at least some portion of the object being absent from the product scanning region; and
causing, via the processor, the indicia reader to operate pursuant to the second set of operating parameters responsive to the distance value in combination with the determined position being indicative of the at least some portion of the object being within the product scanning region.

14. The method of claim 13, wherein the first set of operating parameters includes a relatively reduced operating mode, and the second set of operating parameters includes a relatively increased operating mode.

15. The method of claim 14, wherein the illumination assembly is further configured to emit an illumination light for illuminating the object in a substantially uniform manner during image capture,
wherein the reduced operating mode includes operating the illumination assembly such that the illumination light is one of (i) in an off state or (ii) in a relatively lower illumination state, and
wherein the increased operating mode includes operating the illumination assembly such that the illumination light is one of (i) in an on state or (ii) in a relatively higher illumination state.

16. The method of claim 13, wherein the first set of operating parameters includes at least one of not decoding an indicia appearing within the at least one FOV or not transmitting a payload of the indicia to a host, and the second set of operating parameters includes transmitting the payload of the indicia to the host.

17. The method of claim 11, wherein:
the illumination assembly is further configured to emit an illumination light for illuminating the object in a substantially uniform manner during image capture;
the structured light includes light in a first wavelength range;
the illumination light includes light in a second wavelength range, the first wavelength range being different from the second wavelength range; and
the imaging assembly is operable to sense light in both the first wavelength range and the second wavelength range.

18. The method of claim 17, wherein the first wavelength range is in the invisible range and the second wavelength range is in the visible range.

19. The method of claim 17, further comprising:
causing, via the processor, the imaging assembly to capture image data over an exposure duration; and
causing, via the processor, the illumination assembly to provide both the structured light and the illumination light during the exposure duration.

20. The method of claim 17, wherein:
the image data includes (i) a first frame captured during a first-frame duration having a first-frame exposure period and a first-frame non-exposure period and (ii) a second frame captured during a second frame duration having a second-frame exposure period and a second-frame non-exposure period; and
the method further includes:
during the first-frame duration, cause the illumination assembly to emit the structured light during the first-frame exposure period and cause the illumination assembly to emit the illumination light during the first-frame non-exposure period; and
during the second frame duration, cause the illumination assembly to emit the illumination light during the second-frame exposure period.

* * * * *